No. 891,529. PATENTED JUNE 23, 1908.
A. DUTRIEUX.
SHOCK ABSORBER.
APPLICATION FILED AUG. 14, 1907.
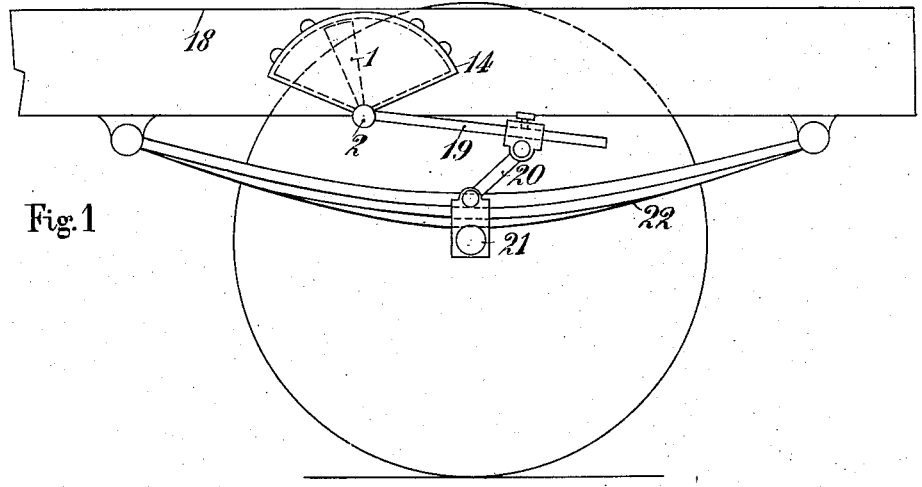
Fig. 1
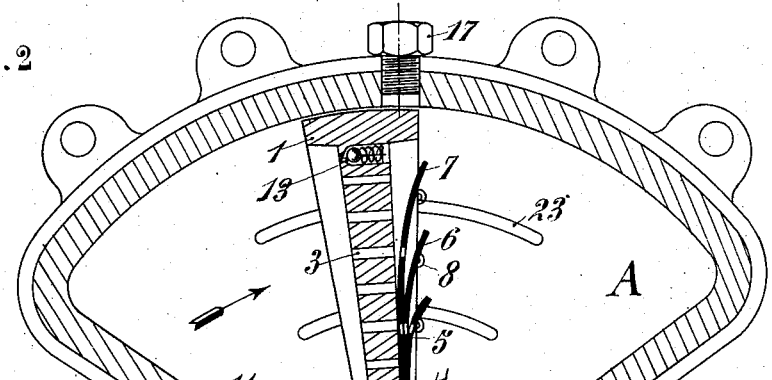
Fig. 2
Fig. 4
Fig. 3
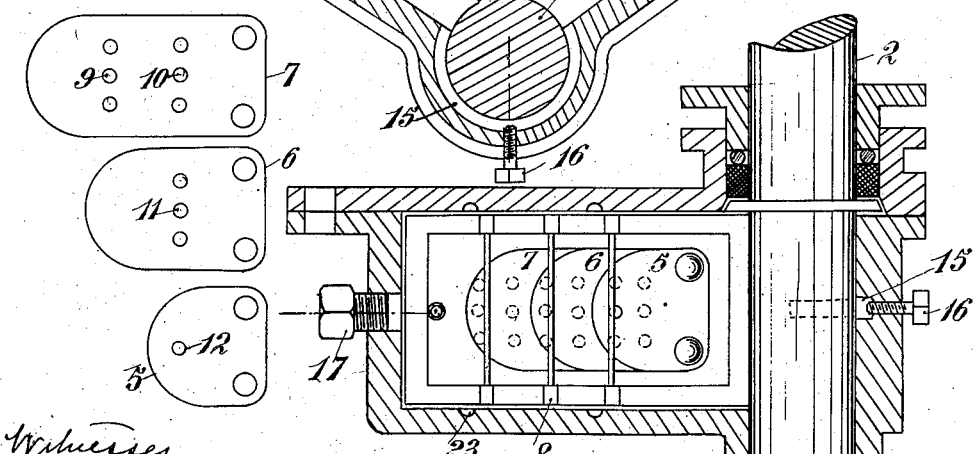

UNITED STATES PATENT OFFICE.

ARTHUR DUTRIEUX, OF LE QUESNOY, FRANCE.

SHOCK-ABSORBER.

No. 891,529.

Specification of Letters Patent.

Patented June 23, 1908.

Application filed August 14, 1907. Serial No. 388,568.

*To all whom it may concern:*

Be it known that I, ARTHUR DUTRIEUX, a citizen of the Republic of France, and a resident of Le Quesnoy, Nord, France, have invented certain new and useful Improvements in Shock-Absorbers, of which the following is a full, clear, and exact description, such as will enable others skilled in the art to which it appertains to carry out the same.

The object of this invention is an apparatus designed to deaden the reactions of the springs in automobile and other vehicles and especially to prevent the sudden return or relaxation of the compressed springs at the same time permitting them to right themselves slowly.

The apparatus is also arranged in such a manner as not to oppose itself to the small vibrations of the springs.

The invention will be fully described with reference to the accompanying drawings.

Figure 1 is a diagrammatic view of the apparatus showing the method of fixing it to the frame of the vehicle and its connection with the axle. Fig. 2. Transverse section of the apparatus on a larger scale. Fig. 3. A section of the apparatus showing a view of the piston looking from the side A of Fig. 2. Fig. 4. Shows the flexible plates separated from one another.

The apparatus consists principally of a box or chamber 14 which seen from the front is of a sector shape and is fixed to the frame 18 of the vehicle. This chamber incloses a wing 1 which acts as a piston. The piston oscillates in the interior of the box 14 which is filled with any suitable liquid such as oil, a mixture of water and glycerin, semi-solid grease or the like, and to permit the liquid to pass from one side of the piston to the other, a number of holes suitably arranged are made in the piston in such a manner that the liquid passes easily in one direction but only with difficulty in the opposite direction.

The piston 1 in order to oscillate under the influence of the movements of the springs is mounted on a shaft 2 on the outer end of which is fixed a lever 19. A link 20 is pivoted at one of its ends to a convenient part of the lever 19 and at its other end is connected to the axle 21 or to its point of attachment to the spring 22.

The wing or piston 1 mounted on a spindle or shaft 2 is pierced with holes 3 which traverse it from side to side. On one of the faces of the piston are fixed by means of rivets 4 three flexible plates 5, 6, 7, of unequal length and of which each partly covers the other. These plates are slightly curved in such a manner as to allow the holes 3 of the piston to be clear or free. Small bars or stops 8 limit the opening of the plates and prevent their being broken as the result of a too sudden push of the liquid. The plate 7 (Fig. 4) is pierced with two ranges of holes 9 and 10 which coincide with two of the ranges of holes of the piston. The plate 6 is pierced with one range of holes 11 which coincide with the range of holes 10 of the plate 7; and the plate 5 is pierced with one hole 12 which corresponds with one of the holes 11 of the plate 6. The numbers of holes are given only by way of example and they may be varied at will, the only necessity being to make them correspond with one another. It is also preferable to arrange in the piston a safety valve indicated at 13, and destined to give a supplementary passage to the liquid in the case of a very sudden compression which might damage or even break the apparatus.

A supplementary passage for the liquid from one side to the other of the piston is furnished by a channel 15 surrounding a part of the spindle 2. The passing of the liquid through this channel can be regulated by the aid of a screw 16 which permits of increasing or diminishing the resistance of the flow of the liquid through the channel.

The filling up of the box or chamber takes place by an orifice closed by a screw stopper 17.

The operation is as follows: To the small vibrations of the spring only correspond small oscillations of the piston 1, the flexible plates 5, 6 and 7 not having time to close themselves the liquid passes through from one side to the other of the piston, through all the holes such as 3 which are formed therein. The spring can thus freely fulfil its function. The vibration is however diminished by the resistance which the liquid encounters in its passage through the holes of the piston. To permit small oscillations of the spring to be produced more freely, grooves 23 are formed in the side of the lateral face of the box or chamber to furnish a supplementary passage to the liquid and oppose less resistance to the small vibrations of the spring. If one supposes a greater compression of the spring the piston 1 is moved more quickly in the direction indicated by the arrow at the moment of righting itself, and the plate 7 which is the most flexible because of its greater length will be applied against the piston and will close the holes with the exception of the two ranges corresponding to the ranges of holes 9 and 10 of the plate 7, the liquid only being able to flow by six holes will create a resistance which will diminish the speed of the return of the spring. If the compression of the spring be still greater which causes a return still more sudden the plate 6 will enter into play and apply itself upon the plate 7 and there will be only three holes 11 which allow passage to the liquid. In the last place the plate 5 will also enter into play and the liquid will only be able to pass by the hole 12. It will be seen then that this arrangement of plates acts automatically and creates an increasing obstacle to the return of the spring the more energetic according as the return of the spring tends to be more sudden. It is to be remarked that the return of the spring is not stopped but only the sudden return or relaxation because the small plates are applied on the piston to close the holes only when the spring in righting itself exerts a certain speed.

The numbers of plates as well as the numbers of holes may be varied according to the importance of the vehicle to which the deadener is to be applied. The plates also may be replaced by a system of valves or other appropriate arrangements closing themselves progressively according to the rapidity of displacement of the piston. Though this system of clacks or stoppers has been shown applied to a piston in the form of a wing it may also be applied to all other kinds of pistons.

The apparatus described has been specially arranged to serve to attenuate and to deaden the vibrations of the sudden return of the spring of automobile vehicles but it can equally be applied to all kinds of vehicles and even to machines and apparatus of all kinds where it is advantageous to make use of a deadening apparatus acting progressively.

Having now particularly described and ascertained the nature of my said invention and in what manner the same is to be performed, I declare that what I claim is:—

An apparatus for deadening the sudden return of springs in which a piston 1 is formed with holes 3 and provided on one of its faces with small elastic plates, also pierced with corresponding holes, of which the number decreases with each plate and each of which plates partially covers the other, the said plates having one of their extremities fixed to the piston and the others standing away in such a fashion that they apply themselves successively upon the piston according to the suddenness of the return of the spring to oppose themselves to such sudden return and to permit its slow return substantially as described.

In testimony whereof I have hereunto set my hand in the presence of two subscribing witnesses.

ARTHUR DUTRIEUX.

Witnesses:
 CHARLES DEFAUX,
 LAURENT BRICKY.